United States Patent Office
3,322,837
Patented May 30, 1967

3,322,837
PERHALOCYCLOPENTENYL CARBINOLS
Edward D. Weil, Lewiston, and Hans L. Schlichting, Grand Island, N.Y., assignors to Hooker Chemical Corporation, Niagara Falls, N.Y., a corporation of New York
No Drawing. Filed June 28, 1961, Ser. No. 122,380
6 Claims. (Cl. 260—617)

This invention relates to the preparation of new fluorinated unsaturated alcohols, useful as organic intermediates generally and especially useful as intermediates for preparing lubricants, thermoplastic polymers, elastomers, films and the like. More specifically, this invention describes a novel group of fluorinated halogenated 1-cyclopentenylcarbinols and bis-carbinols obtained through the following vapor phase reaction:

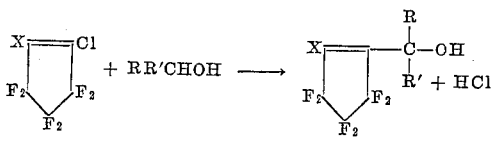

wherein R and R' which may be the same or different, are selected from the group consisting of hydrogen and lower alkyl, and where X is selected from the group consisting of chlorine and fluorine.

Examples of the compositions made by this novel condensation process include but are not limited to (hexafluoro-2-chloro-1-cyclopentenyl)carbinol,
(hexafluoro-2-chloro-1-cyclopentenyl)methylcarbinol,
(hexafluoro-2-chloro-1-cyclopentenyl)dimethylcarbinol,
(heptafluoro-1-cyclopentenyl)carbinol,
(heptafluoro-1-cyclopentenyl)methylcarbinol and
(heptafluoro-1-cyclopentenyl)dimethylcarbinol.

Analogously, the analogs of the above compounds where bromine is present in place of chlorine, may be made by our process.

Where X is chlorine, it is also possible to obtain products of the structure:

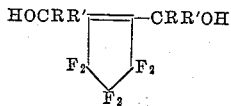

These diols usually occur as minor by-products in the production of the mono-carbinols.

All of the above compositions where the alcohol contains two or more carbon atoms in the group CRR'OH, can be dehydrated by routine dehydration methods to alkylene-substituted halogenated 1-cyclopentenes (or to a bis-alkylene substituted halogenated 1-cyclopentene in the case of the bis carbinols). A small but variable quantity of these mono or bis alkylene products may be formed during the normal course of this inventive reaction. The dehydrated compositions formed have the formula:

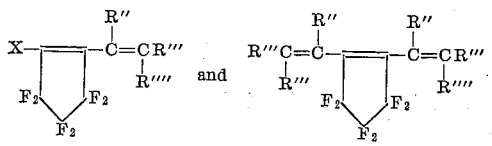

wherein R", R''' and R'''', which may be the same or different, are selected from the group consisting of hydrogen and lower alkyl, the group

being that which results from elimination of the elements of water from the group —CRR'OH, and wherein X is chlorine or fluorine. As has been indicated, all of the above three classes of compositions, i.e., the mono-carbinols, the bis-carbinols and the dehydrated products of the first two classes of compositions are prdouced during a vapor phase condensation of the aforedescribed halogenated cyclopentene and alcohol. The mono-carbinols are the main product with significant amounts of the bis-carbinol becoming apparent as an excess amount of alcohol reactant is used, particularly at higher retention times, or where the mono-carbinol is recycled into the reactor. The dehydrated carbinols are also produced in small amounts during this process, and may be enhanced by recycling the carbinols into the reactor. Preferably, however, the dehydration reaction is performed, where the alkylene-substituted 1-cyclopentenes are desired, by passing the corresponding carbinol of the invention over a solid dehydration catalyst such as alumina, silica gel, calcium sulfate, clay, calcium phosphate, or phosphoric acid at elevated temperature, generally in the vapor phase.

In its composition aspect, our new process is advantageous in a number of respects. For example, the carbinol products may be reacted with many substances to form precursors of chemical resistant thermoplastic substances useful as gaskets, valve packing, chemical resistant tubing, high temperature wire insulation and like uses. Illustrations of the formation of these valuable polymer precursors from the carbinols of this invention are as follows: hexafluoro-2-chloro - 1 - cyclopentenylcarbinol and heptafluoro-1-cyclopentenylcarbinol, both products of this invention, may be reacted with acrylyl chloride to yield hexafluoro-2-chloro-1-cyclopentenylcarbinol acrylate and heptafluoro-1-cyclopentenyl acrylate respectively, both of which are easily polymerized by free radical catalysts such as benzoyl peroxide to the aforementioned useful polymer substances. Similarly, the methacrylate esters of these alcohols may be made using methacrylyl chloride and these esters may similarly be polymerized. Also, the carbinols of the invention may be converted to vinyl ethers, for example with acetylene, and said vinyl ethers may be polymerized.

Other esters of these novel alcohols, such as the esters with phosphorus acids, cyanuric acid, fatty acids, halogenated fatty acids, aromatic acids, and terpene acids are variously useful as plasticizers, hydraulic and functional fluids, special purpose lubricants, floor polish ingredients, and rocket fuel components.

Further, as stated earlier hexafluoro-2-chloro-1-cyclopentenylmethylcarbinol can be readily dehydrated, for example, by passage over alumina catalyst, to form 1-vinyl-2-chlorohexafluoro-1-cyclopentene which is a monomer capable of polymerization to thermoplastic and elastomeric substances of good heat- and chemical resistance. Analgously, hexafluoro - 2 - chloro - 1 - cyclopentenyldimethylcarbinol can be dehydrated to 1-isopropenyl-2-chlorohexafluoro-1-cyclopentene, similarly a useful monomer. Also, analogously, the corresponding monomers having a further fluorine atom in place of the chlorine atom of the above mentioned compounds may be made. Said monomers being polymerized under the usual free-radical polymerization conditions to heat-stable, chemically resistant polymers.

The novel condensation process of this invention is carried out in the vapor phase at a temperature of three hundred and eighty to seven hundred degrees centigrade, preferably four hundred to six hundred degrees centigrade. The temperatures below three hundred and eighty degrees centigrade are unfavorable in reaction time and yield, while temperatures above six hundred degrees centigrade require special and more expensive materials of construction.

The process has the important economic advantage of requiring neither catalyst nor elevated pressures, thus affording savings in maintenance, catalyst cost, labor of charging and removing catalyst, as well as construction costs. While catalysts are not required for efficient operation, favorable catalytic effects may be obtained by use of various sintered and porous materials having favorable surface characteristics such as surface-active solids, activated metals, and various salts.

While the geometry, shape, configuration or design of the reactor is not critical, because of heat transfer advantages tubular designs are advantageous; the reaction is usually carried out in unpacked or packed tubes constructed from a variety of materials. Appropriate packing materials are those which facilitate heat transfer and are inert and heat resistant; they include inert metals and the like. Suitable construction materials are those which combine thermal stability with resistance to hydrogen halides and haloorganics at the reaction temperatures, and include among others, various corrosion resistant alloys, base metals plated with a protective noble metal coating, as well as the noble metals themselves.

While it is convenient to use an operating pressure near atmospheric, pressures higher or lower than atmospheric may be used.

Inert gas diluents such as nitrogen or carbon dioxide, while not essential to operation, may be used if desired to facilitate heat transfer.

Retention times may vary considerably, for example between a fraction of a second up to several minutes, but one to sixty seconds is the preferred range. The ratio of reactants may be varied over a wide range; equal quantities or an excess of either reactant can be used. In general, better yields based on the halogenated cyclopentene consumed are obtained with an excess of the halogenated cyclopentene.

The process of this invention may be carried out in various ways. The reactants may be fed as admixtures through a single inlet line or individually, through separate inlet lines. They may be fed as liquids into the reaction chamber and therein vaporized or may be pre-vaporized and fed into the reactor as gases. All or part of the unreacted starting material, may be recycled along with the feed to the reactor after separation from the products and from the hydrogen chloride by continuous or batchwise fractional distillation or partial condensation. For example, the organic substances leaving the reactor may be condensed, leaving the hydrogen chloride uncondensed to a large degree, by passing the entire effluent from the reactor through a condenser whose temperature is kept below the boiling point of the lowest boiling reactant, then this condensate may be distilled in a continuous or batch still to separate the unreacted reactants from the carbinol products. Alternatively, the effluent from the reactor may be fed directly to a partial condenser or stripping column wherein the separation of the higher boiling product from the starting material is performed. The starting materials, which boil at a much lower temperature than the product, being uncondensed as they leave such a partial condenser or stripping column, may be separated from the hydrogen chloride by a second partial condenser, stripping column or scrubbing column. In certain cases where an excess of the hexafluorodihalocyclopentene is used in the feed, the product may separate as a distinct layer in the condensed reactor effluent and may be isolated by continuous or intermittent decantation, this being a further advantage of the use of an excess of the halogenated cyclopentene in the feed.

The preferred embodiment of this inventive process is to pass a mixture of the reactants containing at least one mole of the halogenated cyclopentene per mole of the alcohol, without catalyst, into an unpacked tubular reactor heated to between about five hundred to about six hundred and fifty degrees centigrade, then condensing the reactor effluent except for the hydrogen chloride, fractionally distilling the condensate, recycling the thus-recovered unreacted starting materials into the reaction zone, and collecting the product carbinol(s) and by-products. Preferably, the individual products are separated by fractional distillation.

Where the ultimately desired products are the halogenated alkenylcyclopentenes, the preferred embodiment is to pass the product carbinols, free of the unreacted starting materials, through a dehydration zone containing a dehydration catalyst and condensing the dehydration effluent and recovering the alkenes by fractional distillation.

None of the examples which follow are to be construed in any manner or form as limiting the concept and scope of this invention both in its composition and process aspect, except as indicated by the specification and claims.

*Example 1*

Hexafluoro-1,2-dichlorocyclopentene is mixed with an equal volume of methanol and the mixture is fed into an empty nickel tube (three-quarters of an inch in diameter, forty inches in length), heated by an electric furnace to six hundred and twenty degrees centigrade. The flow rate is adjusted so that a retention time of six to ten seconds is established, calculated by the equation:

$$\text{Retention time} = \frac{\text{volume of the reactor (liters)} \times 273° \text{ C.}}{\text{moles feed per sec.} \times 22.4 \times (T° \text{ C.} + 273° \text{ C.})}$$

The reactor effluent is passed through a water cooled condenser, and all of the components except the hydrogen chloride are condensed. The condensate is fractionally distilled, recovering the unreacted methanol and 1,2-dichlorohexafluoro-1-cyclopentene (which is utilized as feed for subsequent operation), plus the desired hexafluoro-2-chloro-1-cyclopentenylcarbinol which is obtained in sixty percent yield, based on hexafluorodichlorocyclopentene consumed.

The purity of the carbinol product is confirmed by vapor phase chromatography. The following physical constants were determined: melting point, twenty-six to twenty-eight degrees centigrade, boiling point seventy to seventy-two degrees centigrade (eleven mm.), $D_4^{35}$ 1.6198, $n_D^{30}$ 1.3927. The infrared spectrum proves the presence of the —OH group, the —CH$_2$— group and the carbon-to-carbon double bond.

*Analysis.*—Calcd. for $C_6H_3OClF_6$: Cl, 14.8 percent. Found: Cl, 14.5 percent.

*Example 2*

Using the same conditions and equipment described in Example 1, hexafluoro-1,2-dichlorocyclopentene is mixed with an equal volume of ethanol and fed into the reactor. The condensation product (hexafluoro-2-chlorocyclopentenyl)methylcarbinol is isolated by rectification, unreacted ethanol and 1,2-dichlorohexafluorocyclopentene also being obtained as lower boiling fractions. The purity (ninety-eight percent), of the carbinol is established by vapor phase chromatography. The physical constants obtained are as follows: boiling point sixty to sixty-two degrees centigrade (twelve mm.), melting point sixty to sixty-one degrees centigrade. The infrared spectrum indicated the presence of the —OH, —CH$_3$, and C=C structures.

*Analysis.*—Calcd. for $C_7H_5OClF_6$: Cl, 13.9 percent. Found: Cl, 13.5 percent.

*Example 3*

Using the procedure, equipment and conditions of Example 1, hexafluoro-1,2-dichlorocyclopentene and isopropanol are mixed in a 1:1 ratio by volume and fed into the heated reactor. The principal product, (hexafluoro-2-chloro-1-cyclopentenyl)dimethylcarbinol boiling at seventy-two to eighty degrees centigrade (twelve mm.), $D_4^{35}$ 1.4010, is isolated by fractional distillation. Vapor phase chromatography indicated a ninety-five percent purity. The structure was confirmed by chlorine analysis and by infrared evidence for the —OH, —CH₃, and C=C structures.

*Analysis.*—Calcd. for $C_8H_7OClF_6$: Cl, 13.3 percent. Found: Cl, 13.0 percent.

Example 4

In a manner similar to Example 1, heptafluoro-1-chlorocyclopentene plus methanol are converted to (heptafluoro-1-cyclopentenyl)carbinol.

Example 5

In a manner similar to Example 2, heptafluoro-1-chlorocyclopentene plus ethanol are converted to heptafluoro-1-cyclopentenylmethylcarbinol.

Example 6

In a manner similar to Example 3, heptafluoro-1-chlorocyclopentene or heptafluoro-1-bromocyclopentene plus isopropanol are converted to (heptafluoro-1-cyclopentenyl)dimethylcarbinol.

Example 7

In a manner similar to Example 1, hexafluoro-1,2-dibromocyclopentene plus methanol are converted to (hexafluoro-2-bromo-1-cyclopentenyl)carbinol.

We claim:
1. New halogenated cyclopentenylcarbinols of the structure:

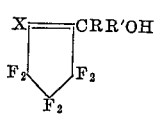

wherein X is selected from the group consisting of bromine, chlorine, fluorine and CRR'OH, and R and R' are selected from the group consisting of hydrogen and lower alkyl.

2. 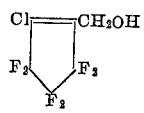

3. 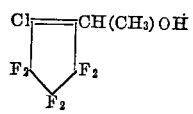

4. 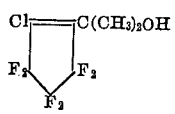

5. 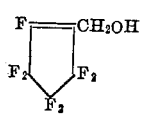

6. 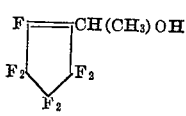

References Cited

UNITED STATES PATENTS

| | | | |
|---|---|---|---|
| 2,871,255 | 1/1959 | Molotsky | 260—617 |
| 3,255,227 | 6/1966 | Neil | 260—617 |

OTHER REFERENCES

Abstract of Nikishin, Izvestiya Akademii Nauk S.S.S.R. Otdeleniye Khimicheskikh Nauk, 1959, No. 6, pp. 1134–1135 (U.S.S.R.).

Henne et al: "Jour. Indian Chem. Soc.," vol. 30 (1953), pages 809 to 814.

LEON ZITVER, *Primary Examiner.*

CHARLES B. PARKER, *Examiner.*